(12) United States Patent
Scholes et al.

(10) Patent No.: US 10,264,327 B2
(45) Date of Patent: Apr. 16, 2019

(54) SYSTEMS AND METHODS FOR DISTRIBUTING DIGITAL CONTENT AT EVENTS

(75) Inventors: Wayne G. J. Scholes, Holladay, UT (US); Jon F. Butler, Sandy, UT (US)

(73) Assignee: Mediaport Entertainment, Inc., Salt Lake City, UT (US)

(*) Notice: Subject to any disclaimer, the term of this patent is extended or adjusted under 35 U.S.C. 154(b) by 595 days.

(21) Appl. No.: 12/188,396

(22) Filed: Aug. 8, 2008

(65) Prior Publication Data

US 2009/0009600 A1 Jan. 8, 2009

Related U.S. Application Data

(63) Continuation-in-part of application No. 11/773,540, filed on Jul. 5, 2007, now Pat. No. 9,189,792.

(51) Int. Cl.
*G06Q 30/02* (2012.01)
*H04N 21/81* (2011.01)
*H04N 7/173* (2011.01)
*H04N 21/222* (2011.01)
*H04N 21/414* (2011.01)
*H04N 21/4363* (2011.01)
*H04L 29/08* (2006.01)

(52) U.S. Cl.
CPC ..... *H04N 21/8113* (2013.01); *G06Q 30/0237* (2013.01); *G06Q 30/0251* (2013.01); *H04N 7/17318* (2013.01); *H04N 21/2223* (2013.01); *H04N 21/41407* (2013.01); *H04N 21/41415* (2013.01); *H04N 21/43637* (2013.01); *H04N 21/812* (2013.01); *H04L 67/22* (2013.01)

(58) Field of Classification Search
None
See application file for complete search history.

(56) References Cited

U.S. PATENT DOCUMENTS

| | | | |
|---|---|---|---|
| 5,482,139 A * | 1/1996 | Rivalto | 186/36 |
| 5,959,945 A * | 9/1999 | Kleiman | 381/81 |
| 7,603,321 B2 * | 10/2009 | Gurvey | 705/65 |
| 2002/0161476 A1 * | 10/2002 | Panofsky et al. | 700/231 |
| 2004/0148424 A1 * | 7/2004 | Berkson | G06Q 30/02 709/236 |
| 2005/0192820 A1 * | 9/2005 | Simon et al. | 705/1 |
| 2005/0289338 A1 * | 12/2005 | Stadlman | 713/153 |
| 2006/0265280 A1 * | 11/2006 | Nakada et al. | 705/14 |

(Continued)

*Primary Examiner* — Jamie R Kucab
(74) *Attorney, Agent, or Firm* — Loza & Loza, LLP; Tyler J. Barrett

(57) ABSTRACT

Methods and systems of offering and distributing digital content to an attendee at an event are described. The system contains a server containing the digital content that can be offered to an attendee as well as recording equipment for creating digital content based on the event. The digital content can be then distributed directly to a portable electronic device accessible to an attendee or distributed indirectly using a kiosk located near the event. The server can communicate both with the portable electronic devices and with the kiosk. Once the attendee has been offered the digital content, the attendee can request that the digital content be distributed from the server to that portable electronic device or distributed to a kiosk where the digital content can be retrieved by the attendee. Other embodiments are described.

12 Claims, 2 Drawing Sheets

(56) References Cited

U.S. PATENT DOCUMENTS

| | | | | |
|---|---|---|---|---|
| 2007/0078706 | A1* | 4/2007 | Datta | G06Q 30/02 705/14.5 |
| 2007/0156443 | A1* | 7/2007 | Gurvey | 705/1 |
| 2008/0113733 | A1* | 5/2008 | Kushner | G06Q 30/06 463/17 |
| 2009/0254931 | A1* | 10/2009 | Pizzurro | G06Q 30/02 725/5 |

* cited by examiner

SYSTEMS AND METHODS FOR DISTRIBUTING DIGITAL CONTENT AT EVENTS

CROSS-REFERENCE TO RELATED APPLICATION

This application is a continuation-in-part of U.S. patent application Ser. No. 11/773,540, filed Jul. 5, 2007, the entire disclosure of which is hereby incorporated by reference.

FIELD

The application generally relates to systems and methods for the distribution of digital content. More particularly, the invention relates to methods and systems for offering and distributing digital content to an attendee at an event.

BACKGROUND

Many types of information and content are now stored digitally, including books, music, movies, software programs, video games, databases, advertisements, as well as other content. Because such content is stored digitally, it can be transferred easily using many types of electronic networks. See, for example, U.S. Pat. Nos. 5,875,110, 4,412,292, 5,848,398, 6,397,189, 6,381,575, 4,674,055, 5,445,295, 5,734,719, 6,286,029, 6,799,165, 6,655,580, 6,330,490, 6,662,080, 6,535,791, 6,711,464, 5,237,157, 6,654,757, 5,794,217, and 6,748,539. Both private and public electronic networks, including the internet, are frequently used to transfer the digital content.

Often the digital content is transferred electronically so that it can be sold to a user who is not located where the digital content is originally stored. The digital content can be sold for a variety of purposes, including education, entertainment, research, or other purposes. For example, many people spend their leisure time at events, such as movies, concerts, theatrical performances, speeches, sporting events, and the like. These events may be unique or memorable and, therefore, people will often desire content (such as photographs, video recordings, and audio recordings) during or after attending that event. However, a person may not be able to quickly acquire digital content during or after the event.

SUMMARY

This application describes methods and systems of offering and distributing digital content to an attendee at an event. The system contains a server containing the digital content that can be offered to an attendee as well as recording equipment for creating digital content based on the event. The digital content can be then distributed directly to a portable electronic device accessible to an attendee or distributed indirectly using a kiosk located near the event. The server can communicate both with the portable electronic devices and with the kiosk. Once the attendee has been offered the digital content, the attendee can request that the digital content be distributed from the server to that portable electronic device or distributed to a kiosk where the digital content can be retrieved by the attendee.

BRIEF DESCRIPTION OF THE DRAWINGS

The following description can be better understood in light of the Figures, in which.

Figure 1:
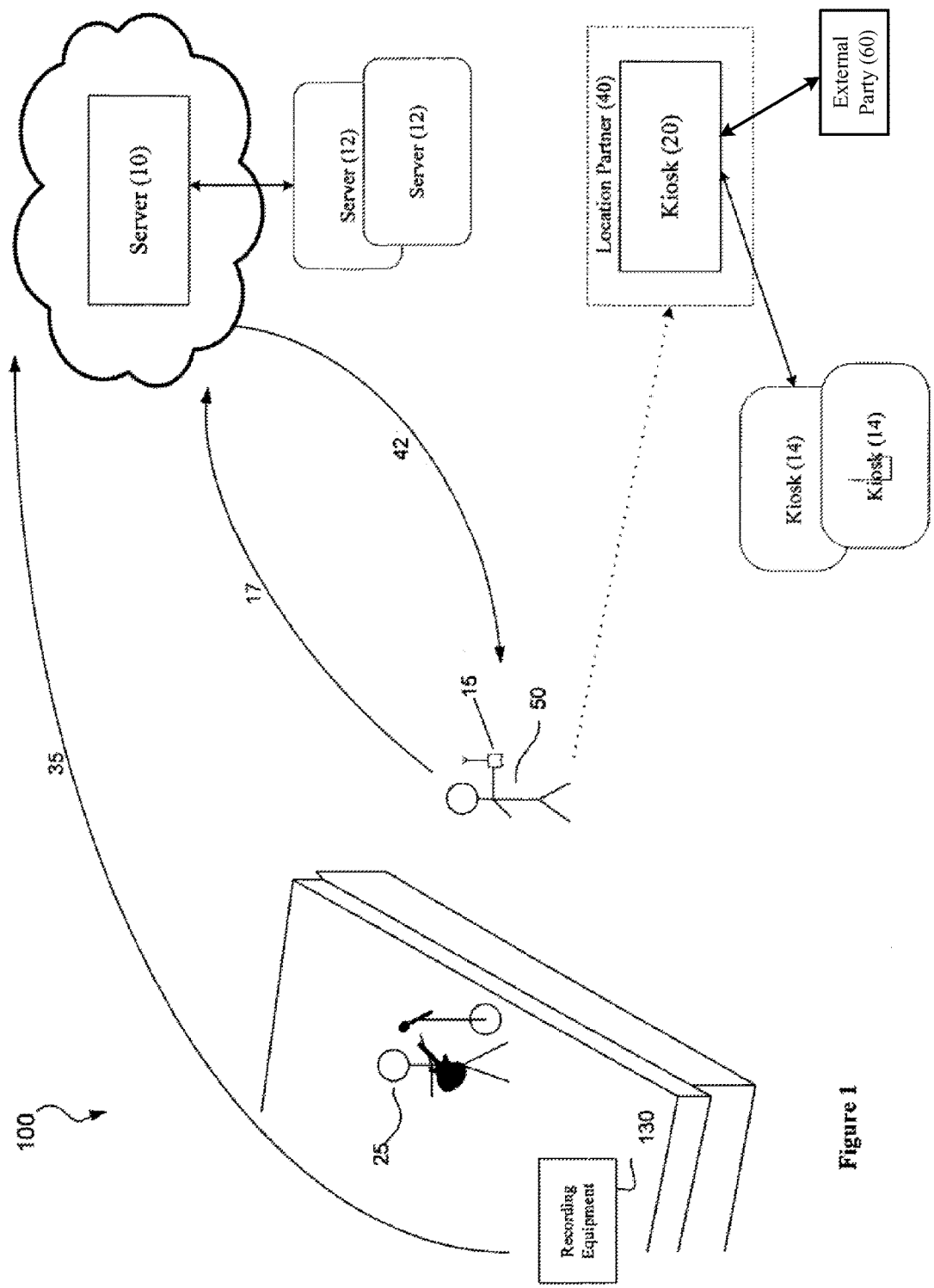
FIG. 1 depicts some embodiments of the systems for offering and distributing digital content to an attendee at an event.

Together with the following description, the Figures demonstrate and explain the principles of the systems and methods for the distribution of digital content. In the Figures, the thickness and configuration of components may be exaggerated for clarity. The same reference numerals in different Figures represent the same component.

DETAILED DESCRIPTION

The following description provides specific details in order to provide a thorough understanding. The skilled artisan, however, would understand that the systems and methods can be practiced without employing these specific details. Indeed, the systems and methods can be practiced by modifying the illustrated system and method and can be used in conjunction with apparatus and techniques conventionally used in the industry. While the description focuses on distribution of content to an attendee's portable electronic device or a kiosk, the systems and methods could be used to distribute the content via other mechanisms, such as short message services (SMS).

Some embodiments implementing these methods and systems will be described with reference to FIG. 1. FIG. 1 illustrates embodiments of the distribution of digital content to the attendees of an event. FIG. 1 shows a system 100 for an event (i.e., a concert), including an attendee 50 and a performer 25. The system 100 can contain recording equipment 130. The system 100 also contains a storage device (i.e., server 10) in a first location where the digital content can be stored, a distribution device (i.e., kiosk 20) in a second location for delivering the digital content to a user of the distribution device (i.e., an attendee of the event), a receiving device for receiving the digital content that has been distributed (i.e., the portable electronic device 15 of an attendee), and means for communicating (i.e., a communications link) with the attendee who is optionally not located at the location of the distribution device or the storage device.

Prior to discussing the details of this system 100 (or any other device described herein), it should be understood that the following description is presented largely in terms of steps and operations that may be performed by conventional computer components. These computer components, which may be grouped in a single location or distributed over a wide area, generally include computer processors, memory storage devices, display devices, input devices, etc. In circumstances where the computer components are distributed, the computer components are accessible to each other via communication links, such as those illustrated in FIG. 1. The system 100 could equally operate within a computer system having a fewer or greater number of components than those illustrated in FIG. 1. Thus, the depiction of system 100 should be taken as illustrative and not limiting. For example, the system 100 could implement various services components and peer-to-peer network configurations to implement at least a portion of the processes.

The first location can be located anywhere desired by the operator of the system, including in a central location such as the event, nearby the event, or even at a remote location. The first device acts as a repository for any desired digital content. The first device also permits an operator or administrator of the system 100 to manage all of its operations at a single location, permitting roll-out of digital content (and the related materials described herein) across all or select distribution devices and real-time feedback from each distribution device as to its use and functionality.

Any device that can operate in this manner can be used as the first device. One example of the first device comprises a server 10. Any type of server known in the art can be used as server 10. Examples of servers that can be used include a computer running a UNIX-style operating system, a computer running a Microsoft Windows operating system, or a personal computer workstation. The server 10 comprises any storage component on which the digital content can be stored. Examples of storage components include optical storage discs, DVD-RAM discs, and traditional magnetic hard disc drives.

Another example of a storage component includes any known database (or combination of databases). The database stores any desired information, including information regarding the digital content and any user interaction with the system. For example, the database stores data regarding the content inventory at each of the distribution devices. The database can also store sales information, user information, and transactional information. The database may be a Microsoft SQL database, a Microsoft Access database, an Oracle database, a MySQL database or combinations thereof. In some embodiments, the server can contain an event database (or module of a database) for managing and monitoring the event and a digital content database (or module of a database) for managing and monitoring the digital content.

In some aspects, multiple servers 12 may be connected together to make a server cluster. Using a server cluster permits sharing information regarding the content stored on each server 10 and each transaction or event the server 10 has recorded. By using a server cluster, the system 100 is always operational, regardless of the location of a particular component on the network that connects the components (such as the internet). The server cluster can contain a primary cluster, which handles all critical tasks, with minor functions being routed to a secondary cluster. With this configuration, if the primary cluster is not operational, most functions can be handled by the secondary cluster. A server cluster also allows for large-scale deployment and interoperability, as well as data that can be stored on the network in multiple points of co-location.

The software components required for operating the server 10 may be included on a single server or on multiple servers, with each server implementing one or more tasks and communicating among themselves using standard networking protocols. Non-limiting examples of the server-focused tasks using the software components that may be implemented on one or more servers 10 include those of e-mail server; Web server; file server; purchase transaction authentication server; transaction push server; event monitoring server; content management server; content synchronization server; content security server; and advertising/promotional message server.

As depicted in FIG. 1, the server 10 manages and stores digital content. The types of digital content that can be stored (and then delivered to an attendee 50 or other user) are virtually unlimited. Examples of the digital content include music, movies (including trailers), video games (including trailers), software, mobile phone ring tones, electronic books, advertising, and other types of content. The format in which the digital content is stored is also virtually unlimited. Examples of the types of digital formats include pdf, doc, xls, jpeg, tiff, gif, xbm, pnm, mpeg2, mpeg4, mp3, oma, m4a, wma, wmv, mov, wav, and avi, as well as combinations thereof. The digital content can also be provided in any known language.

In some embodiments such as where the digital content is recorded, it may be provided internally (by the entity that controls or operates the system 100), by the recording equipment 130 (or any similar device) located at the event, or externally by one or more third parties that are the copyright owners of the content or that act on behalf of the owners of the content (collectively, content providers). In other embodiments, the digital content is provided on a real-time basis and therefore can be provided live by the performer 25. Non-limiting examples of content providers include concert promoters, music publishers, video publishers, recording companies, movie studios, television studios, book publishers, artists, performers, end-users, mobile telephone companies, video game manufacturers, and advertisers. Content providers may provide the content to the server 10 using any known mechanism, including via wired or wireless network connections known in the art or via other methods, such as merely providing a CD or DVD to the operator of the system. In some embodiments, the content providers can provide the digital content to a distribution device(s), which can then be transferred to the server 10.

Optionally, the digital content can contain instructions indicating how the content may be used, distributed, sold, transmitted, or otherwise processed (use instructions). The server 10 can convert such use instructions into digital rights management (DRM) information that can be associated with any desired content. The DRM information may include any number or combination of restrictions, including those that are enabled by a DRM technology and that are selected by a content provider. Non-limiting examples of DRM restrictions include a restriction that visual or textual content not be printed in hardcopy; a restriction that copy-and-paste functions are disabled for textual content; a restriction that a music file may not be played after a certain date; a restriction that a music file or video file may only be played a fixed number of times; and a restriction that a file may only be copied to another device a fixed number of times. Other examples include variable pricing, variable billing, and variable payment methods.

The DRM information may be provided by a third party (such as a content provider or a location partner 40) or by the operator of the system 100. Either may assign a unique transactional ID to each piece of digital content. This unique transactional ID correlates to a set of use instructions and DRM specifications to control how the associated content is managed on devices, such as on the server 10, as described herein. The digital content may therefore contain metadata (i.e. metatags), use instructions, and a transactional ID.

The metadata (i.e., metatags) can correspond to information about any desired content, such as a genre of music or movie, an artist, a content provider, content release date, or other information. The metadata could also contain advertising data for the desired content, such as a coupon or information about a fan club for the performer. The metadata can include information on how the user can get or take delivery of the digital content. The metadata can also include information about the event, such as a lottery for a backstage pass which the user could obtain by providing information via the portable electronic device 15 (i.e., by pushing a series of numbers for entering the lottery).

The metatags may be provided by a content provider, location partner, or created by the operator of the system. The metatags may indicate the use instructions for all content that is provided, with distinct use instructions for each piece of content, or with use instructions based on parameters that can be used to classify content. In one example of use instructions, a content provider 30 may indicate that music performed by musical artist A may be redistributed freely, without restriction, music performed by musical artist B may be redistributed freely when purchased at a set price, and music performed by musical artist C may be redistributed in a manner that permits the music to be copied to another computer three times, after which the music may not be copied to another computer, but only played (performed) on a computer where it is stored.

The digital content may optionally be encrypted in a manner to increase security of the content during storage on a server 10 or on a distribution device, or during transfer between a content provider and a server 10, between a server 10 and the distribution device, or between the distribution device and the receiving device. Any number of encryption methods known to those in the art may be used to implement this feature. Examples of such encryptions include both symmetrical and asymmetrical encryption using a variety of methods, including RSA, DES, Triple DES, AES, Blowfish, ElGamal, RC4, and others.

When the distribution device is placed in a location that is remote from the first device, a location partner 40 can optionally be used in the system 100 as depicted in FIG. 1. The location partner comprises an individual or entity that provides a space where the delivery device may be physically located. Non-limiting examples of such location partners include any of the content providers, owners or managers of airports, bars, clubs, schools, gyms, stadiums, arenas, amusement parks, military bases, retail centers or shops, libraries, universities, and eating establishments.

A location partner 40 may provide this space without charge, as a service to individuals that visit the space where the delivery device is placed. Or the location partner 40 may provide this space in exchange for a fee of some type, or in exchange for advertising time or space on the distribution device, or for other benefits. In some embodiments, the location partner 40 may control or limit the content that is available via the distribution device including the digital content available from the event. In other embodiments, the location partner can also control the advertising at the distribution device.

As described above, the system 100 also contains a distribution device that can be located in a second location that is optionally remote from the first location and/or optionally remote from the event. The distribution device receives the content from the first or storage device and then distributes that content to a user (i.e., a purchaser). Any device operating in this manner can be used as the distribution device. In some embodiments, the distribution device comprises any known vending machine or any known kiosk, such as the kiosks described herein.

The kiosk provides a point-of-sale (or rental) experience for any user, including both actual and merely potential purchasers of the digital content. Any person can be a user by interacting with the kiosk, whether by purchasing content or merely viewing the kiosk and/or the content on the kiosk, such as by sampling music contained in the kiosk. In some embodiments, the kiosk can limit the time of interaction with a given user, can limit the viewing of a specific user, and/or limit the downloads—whether number or time—of a specific user. The kiosk used in the system can be any kiosk known in the art or the kiosk described herein. In some embodiments, the kiosk may physically display any known advertising, such as posters, banners, or adhesive advertisements. The kiosk may also be used in conjunction with products as a point-of-purchase display.

The kiosk can contain any combination of number of video displays. In some embodiments, the kiosk contains two video displays, a first video display that displays advertising messages and a second video display that displays menus, samples of content, and related information appropriate to affect a purchase by an end-user of the content made available through the kiosk. In other embodiments, though, the kiosk can contain only one video display, as well as three or more video displays. The video display can comprise any known displays, including LED displays, TFT displays, LCD displays, CRT displays, touchscreens, and combinations thereof.

The kiosk can also contain multiple input and output devices appropriate to interact with a user, display or perform the content stored on the kiosk, and complete a sales transaction related to the content. These input and output devices may include, for example, one or more of any of the following: a keyboard; a mouse; a trackball; a joystick; a touchscreen; a a label maker; an automatic coupon feeder; a barcode scanner; an image scanner; biometric scanning devices such as a fingerprint, voiceprint, hand geometry, or retinal/iris scanner; a Compact Disc reader; a Compact Disc writer; a video disk reader; a video disk writer; and media device connectivity, including a USB port, an IEEE-1394 FireWire port, a SecureDigital (SD) port, a CompactFlash port, a PCMCIA port, a MemoryStick port, a laser printer, a receipt printer, a video camera, a camera, an audio recorder, a credit/debit/gift card reader, a cash acceptor, a coin acceptor, a check acceptor, a jewel case ejector, a phone docking station, speakers, voice recognition device, signature verifier, facial recognition device, Braille input device, bubble sheet/multiple choice form scanner (such as a Scantron machine), Bluetooth communications, Wi-Fi communications, Wi-Max communications, and other input or output device known in the art. Furthermore, additional input, output, and storage technologies known in the art may be integrated with the kiosk, including any and all mobile or portable devices.

The kiosk can also include a controlling device that operates the video displays, interacts with input and output devices, and communicates with other kiosks or servers 10, in real-time or as needed. In some embodiments, the controlling device includes two or more computers, either sharing or dedicated to the needed tasks requisite to controlling operation. In some configurations, one computer handles the display, selection, and processing of content purchase transactions and a second computer handles the remainder of the tasks required of the kiosk.

Figure 2:
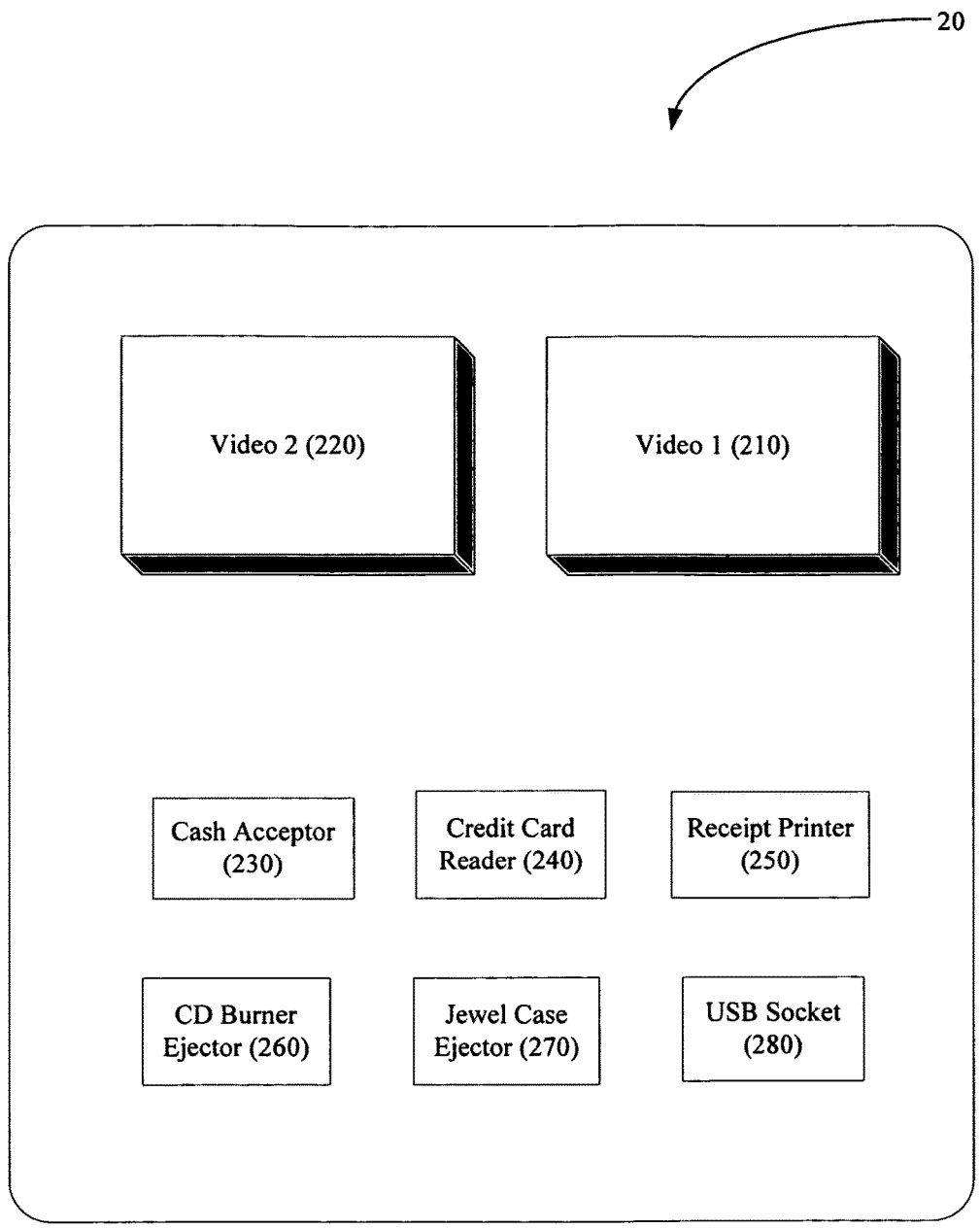
FIG. 2 depicts some embodiments of a kiosk that can be used to distribute content to an attendee at an event.

FIG. 2 illustrates one example of kiosk. In FIG. 2, kiosk 20 contains a video display 210 on which advertising or promotional messages are displayed; a video display 220 comprising a touch screen device through which a user may view and select content; a cash acceptor 230 through which a user may make payment for content; a credit card reader 240 through which a user may make payment for content; a receipt printer 250 that dispenses a paper receipt of a transaction when content is purchased; a CD burner ejector 260 that dispenses an audio CD containing content selected by a user during a purchase transaction; a jewel case ejector 270 that dispenses an empty jewel case for holding an audio CD; and a USB socket 280 to which a user may connect a receiving device for delivery of content, as described herein. In some embodiments, the kiosk 20 could eject the CD that has been placed in a jewel case. As noted previously, a kiosk 20 may contain different—or additional—components than those shown in FIG. 2, including an end unit that comprises a mobile or portable device.

In some embodiments, the video displays of the kiosk 20 incorporate known touch screen technology. Thus, it can provide a user interface that presents a visual display of pertinent information during the interaction and distribution processes, as well as operate as a user interface for entry of user commands. In some embodiments, the kiosk 20 also includes any known audio technology, such as speakers or headphones.

The kiosk 20 can include a user-friendly interface, including a graphical user interface with a touch screen capability. If desired, multiple interfaces can be incorporated in the kiosk situated at high traffic locations, such as by being positioned on each side of the kiosk. The user interface comprises a hierarchy of pages that a user navigates through to accomplish different tasks. For example, a user may search for a specific song, title or artist; once the user's selection is found, the selection may be sampled, and eventually purchased. The same process applies to all digital content types where a user can interact with the kiosk 20 to accomplish different tasks associated with the content.

The various components of the system 100 can be electronically connected to each other using any means known in the art. In some embodiments, the system 100 contains a computer network. Computer networks are well known in the field of communications. Computer networks may include communication links that extend over a local area or a wide area, or even be global. Examples of these communication links include Ethernet, frame relay, DSL, satellite uplink, cable modem, analog modem, fiber channel, infrared and microwave transmissions, wireless communications of various types, SMS, and other wired or wireless networking technologies known in the art. Such connections may also be constructed through a publicly accessible network, such as the Internet, so long as appropriate security measures, as are known in the art, are used to prevent unauthorized access to the content that passes across the connection. A private network connection may also be used in order to reduce the reliance on such security measures and to further ensure the integrity of content that is transferred via this connection.

The various components of the system 100 are able to communicate with each other whenever needed. In some embodiments, the server 10 and any kiosk 20 may communicate at regular or scheduled intervals, in real-time, or in an ad hoc manner according to needs that arise as determined by the server 10 or the kiosk 20. Since actual real-time communication may be limited by the transmission speeds available, the communication may be on a substantial or near real-time basis.

In some embodiments, the various components of the system need not be electronically connected. For example, the kiosk 20 need not be connected to the server 10 on a continuous basis. Rather, the kiosk can operate in a stand-alone mode, with digital content being transferred to the kiosk 20 via non-networked means, and purchase transactions and data being collected via non-networked, intermittent means. A stand-alone kiosk 20 can be used, for example, when security procedures or network connectivity are not available, such as a kiosk 20 located on a military base in a different country than the server 10 from which it would otherwise receive content.

The systems described above can be used to transfer the digital content from the first device to the distribution device, where it then can be optionally distributed to an individual user (such as an attendee of an event) via a receiving device. While the digital content can be transferred by the system in any manner, in some aspects, it can be transferred in a semi-dynamic manner, dynamic, or even static manner. The digital content can also be transferred to any distribution device (or group of devices) at once or one at a time.

When the digital content is transferred from the server to the kiosk, the operator of a server 10 may customize which content (or category, group of content, or advertising) is transferred, customize which content is transferred from a server 10 to a particular kiosk 20 (or to a collection of multiple kiosks 14), as well as customize the billing.

When a user views the kiosk, purchases content, or otherwise interacts with the kiosk, the kiosk may collect any desired type of data (collected data). Some examples of collected data may include data about the individual user (user data), data about the user's interaction with the kiosk (kiosk data), data concerning the demographics of the kiosk location (location or demographic data), financial data, and so forth. The kiosk (or other distribution device) may collect the data in any manner known in the art.

For example, during the user's interaction with the kiosk, the kiosk may gather user data. User data may include any information that relates to the user and/or the user's activities. One example of user data may include conversion data, such as pages viewed, images viewed, color schemes viewed, time of viewing, time of viewing in relation to purchase, content or item(s) purchased/downloaded, requests made, demos/games played, registrations, signups, advertisements viewed, and so forth. Another example of user data may include user browsing activities, such as content viewed, content selected, time spent viewing different content, and total interaction time. Yet another example of user data may be demographic information, such as the user's age, sex, ethnicity, race, marital status, household size, schooling/education, income, profession, languages spoken, citizenship, and the like. Still another example of user information may include survey data, such as consumer satisfaction surveys, event expectation surveys, post-event evaluation surveys, polling/voting data, and so forth. Another example user data may include user preference data, such as user selected color schemes, content preferences, advertisement preferences, e-mail preferences, and the like. Another example of user data includes user-indicated items of interest, such as forms and genres of entertainment and hobbies. In yet another example, user data may include user account information, such as username, password, address, phone number, e-mail address, unique login identifiers, cookies, user specific survey/conversion data, etc. In still another example, user data may include biometric data, such as fingerprints, voiceprints, hand geometries, retinal/iris scans, signature verifications, facial recognitions, video feed of end-user, pictures taken of end-user, audio recordings, and the like. Moreover, additional information may be collected and/or extrapolated from the any information/data that has been input by the user.

In some embodiments, the data obtained from the user can include the user's email account. That account can be used to further customize the kiosk experience for the user and/or used for a user to join a community of users (such as a fan club of the performer 25 at the event). As well, that email account can be used to allow the user to receive additional electronic advertising, including notices of upcoming content, events, products, and similar topics. The user's email account may also be used when sharing the information among a community to which the user belongs. In some instances, the user can have a membership whether or not the user has an email account. For those users having a membership, the interaction can be customized. The member can enter his/her membership when prompted and can then be presented with customized menus based on past interaction/sales patterns.

The collected data also includes kiosk data. The kiosk data can include any of the user's interaction with the kiosk including, as non-limiting examples, the following: the areas of the content navigation system visited by the end-user; the advertising content displayed immediately prior to and during the end-user's interaction with the kiosk; the advertising content displayed immediately prior to and during the end-user's purchase from the kiosk; the nature of the delivery device selected by the end-user; method of payment, and others. For instance, the kiosk data may also include sales transaction data, which may indicate purchases contemplated or completed by the end-user, content sold, content price, royalty information, license numbers, inventory ID numbers, transactional IDs, etc.

The collected data may also include location or demographic data. The location data may relate to the demographic environment at the location of the remote device, i.e., print/design advertising or products associated with remote device, kiosk location, seismic/meteorological activity, local advertisements, local artists, local event calendaring, and so forth.

The collected data also includes financial data. The financial data may include sales transaction data, which may indicate purchases contemplated or completed by the user, content sold, content price, royalty information, inventory ID numbers, transactional IDs, etc. Examples of other types of financial data include payment information, sales information, credit/debit/gift card information, promotional/discount codes, accounting information, and so forth.

The kiosk can operate in either a continuous or a batch mode. In the continuous mode of operation, the collected data for each transaction is transmitted quickly from the kiosk to the server. Then, the collected data is deleted from the memory of the kiosk without storing the data at that particular kiosk. In the batch mode, the collected data for each transaction is retained at the kiosk until such time as the kiosk transmits all of collected data at once.

The collected data may be shared with any external party 60 of the system. The collected data can be shared with the external party 60 by either transmitting the data to them or by allowing them to access the system either directly or indirectly through a Web page/Web portal. In the former situation, the collected data may be optionally collated, analyzed, summarized, or otherwise processed using a variety of steps. This situation may allow the operator of the system to perform the analysis, filter the results, and/or customize the data that is sent to the external party 60. In the latter situation, the external party 60 can view the collected data before (or as) it is received from the kiosk(s) or anytime during the analysis, filtering, or customization process. Of course, access to the system by the external party 60 can be established using any parameters desired by the operator of the system and/or the individual user that provided the data, i.e., access may be limited to only certain portions of the collected data.

In certain situations, the collected data can be sent directly to other kiosks. Such situations can be advantageous when the external party 60 wants to access data from a group of kiosks in the same location or vicinity (i.e., a primary and a secondary kiosk). In these situations, the data can be transmitted to-or-from the secondary kiosk, allowing the external party 60 to access the collected data for both the primary and the secondary kiosks. This situation may give the external party 60 more access to the raw data that has been collected, but does not necessarily allow the operator of the system to analyze, filter, or customize the report. Again, access to the collected data can be established using any parameters desired by the operator of the system, i.e., access may be limited to only certain portions of the collected data.

In some embodiments, the collected data may be purposefully reported to location partners 40 or content providers, including copyright owners. If content providers, copyright owners, or others are due royalties or other payments based on use or sale of content, such royalties or other payments may be made from the operator of a server to the appropriate recipient using automated means known in the art, based upon sales and demographic data. A system operator can also authorize any third party to receive reports and restrict the reports that the third party can access.

All of the collected data from the distribution device(s), Web portal, and/or Web page can be used for numerous purposes. In some aspects, the collected data can be used to enhance and/or customize the operation of the system. In other aspects, the collected information can be part of the general and specific market research data that can be used by the operator of the system as known in the art. In yet other aspects, the collected information can be used to customize the content and/or the advertising provided to the user (both current advertising and future advertising). For example, the collected data can be used to customize the content delivered to the kiosk or be used to predict the types/genre of media that will be popular to a given attendee of a specific event. Alternatively, the collected data can be used to customize the digital content by the time of day, the geographic location, etc. In some embodiments, the collected data can then be used to customize the advertising for an individual attendee or a group of attendees. Since some of the collected data includes user's feedback of the digital content, the collected data can be used to rate the digital content being performed by the performer 25.

The collected data can be used to customize the advertising directed to the attendee 50. The advertising may include messages used to market, promote, or sell products or services; or to enhance brand recognition, as well as training materials, entertainment content, community or location information, and other similar materials. The advertising may also include video clips, audio clips, ring tones, printed coupons, promotional codes, brochures, literature, images, giveaways, discounts associated with digital content, or other promotional or brand-related content. In some embodiments, the advertising may be presented through video and/or audio presentations, animated PowerPoint presentations, flash programs, banners, pop-ups, screen-savers, wallpapers, posters, digital sampling, cost-per-pixel, cost-per-click, advertisement images, printed advertisements, trademarks and other similar advertisements. One example of the advertising includes the promotion of artists or performers whose products or content are available for sale on the kiosk and/or who are performing at the event. In still another example of the use of the collected data, it may be used in any method of viral marketing.

The user does not need to physically present at a kiosk to interact with it. The user can interact with the kiosk via a Web portal that is in communication with the kiosk. In some embodiments, this communication can comprise a wired connection, such as a user accessing the Web page or Web portal via a desktop computer. In other embodiments, though, the communication can comprise a wireless connection, such as a user accessing the Web page or Web portal via portable electronic device 15, like a cellular telephone using SMS technology.

When a user purchases content through a kiosk 20, that content is made available to the user using any receiving device known in the art. The receiving device can be provided by the kiosk 20 or can be provided by the user (i.e., it can be the same as the portable electronic device 15). Non-limiting examples of some content receiving devices can include playback devices or storage devices. Examples of the playback devices include portable computers, MP3 players, iPods®, video players, or mobile/cellular phones. Examples of the storage devices include portable computers, mobile/cellular phones, pagers, text messaging devices, calendar or text information devices, recordable media such as memory chips and cards, CDs and DVDs (or similar video or data discs), writeable data CD such as WORM or CD-RAM, flash drives, USB sticks, or flash memory storage devices. The digital content may be stored on these receiving devices magnetically, optically, or electronically as well as any other storage mode known in the art. In some aspects, the digital content can be placed on a receiving device, along with migrated plug-ins or software that can be used to play the digital content received.

The attendee 50 may be attending the event remotely or at the event's physical location, as shown in FIG. 1. The attendee 50 (or other user) may have use of a portable electronic device 15, which can be the same or different than the receiving devices described above. In some embodiments, the portable electronic device 15 has the capability of wireless communications, including Bluetooth®, WiFi, WiMax, infrared, or combinations thereof, and so may communicate with the server and/or the kiosk.

As shown in FIG. 1, recording equipment 130 may be configured to record the event 100. Accordingly, the recording equipment 130 may contain any video or audio components that provide such a function. The recording equipment may also be configured to transmit the recording, illustrated as line 35, to the server 10 (or even to the kiosk 20). In some embodiments, the recording equipment 130 records the event and streams the recording to server 10 which stores the recording for later retrieval. Alternatively, the recording may be stored on the recording equipment 130 and retrieved by the server 10 and/or kiosk 20 at the request of an attendee 50.

As shown in FIG. 1, an offer a recording of the event may be made to attendees before, during, or after the concert. For example, the performer 25 in a musical concert can offer a recording of the concert to any attendee 50 for a price. The offer may comprise instructions to an attendee 50 to accept the offer by dialing a number on his or her portable electronic device 15 and also provides a list of payment options. Attendee 50 may then accept the offer by dialing the number using the mobile communication ability on the portable electronic device 15. At that point, or at a later time selected by the attendee, the recording can be downloaded from server 10 to the portable electronic device 15.

The attendee can pay for the recording of the event either before, during, or after the distribution of the digital content. The server 10 may also bill the attendee 50 for the content of the offer. In some embodiments, the attendee 50 may be required to enter billing information to complete acceptance of the offer. In other embodiments, the cost of the content may be charged to the service provider for the portable electronic device 15 and the server 10 may send an invoice to the attendee at a later time.

Once the price has been paid, the recording of the concert can be distributed to the attendee 50. In some embodiments, the content (i.e., the recoding of the event) may be sent on a physical media to attendee's address at a later time. In other embodiments, the recording may be sent from the recording equipment 130 directly to the portable electronic device 15. In yet other embodiments, the recording is streamed from the server to the portable electronic device 15 during or after the event 100, as shown by line 42. In still other embodiments, the attendee can be directed to retrieve the content from kiosk 20 which is typically—but not necessarily—located near the event.

In some embodiments, the selected digital content (along with the DRM information and any other information) is transferred from the kiosk, server, or even directly from the recording equipment to the portable electronic device 15 of the attendee. In other embodiments, the attendee can receive a magnetic or optical storage device containing the digital content from a receptacle in the kiosk, i.e., a CD/DVD burner ejector. And with a portable storage device, the digital content can be transferred from the kiosk using any electronic connection, such as a USB socket, or a wireless connection. In some instances the attendee can immediately access/use that digital content, i.e., listen to the recording. In other instances, though, the attendee must transfer the digital content to another device that is capable of using/accessing the digital content.

The kiosk 20, recording equipment 130, and the server 10 (and any other components) can be electronically connected to each other using any means known in the art. Examples of these connections include Ethernet, frame relay, DSL, satellite uplink, cable modem, analog modem, fibre channel, infrared and microwave transmissions, wireless communications of various types (e.g., WiFi, WiMax, and Bluetooth®), SMS, and other communication technologies known in the art. Such connections may also be constructed through a publicly accessible network, such as the internet, so long as appropriate security measures, as are known in the art, are used to prevent unauthorized access to the system. A private network connection may also be used in order to reduce the reliance on such security measures and to further ensure the integrity of the content that is transferred via this connection.

An attendee 50 that has received any digital content may be able to share previews of that content with others. Shared previews may provide limited use of the content along with an offer to purchase or receive part or all of the digital content. An attendee may receive a commission for sharing a preview of content that led to a purchase of the content by another.

These systems and devices can be used to offer and distribute digital content to an attendee at any type of event. An event may be, but is not limited to, a music concert, theatrical performance, speech, academic event, book reading, sporting event, movie, diversion activity, educational activity (such as a lecture), video productions, television programs, live broadcasts, or combinations thereof. In some embodiments, the event comprises a musical concert or a video production.

During such events, both digital content and non-digital content can be offered for sale or rental. The non-digital content that may be offered at an event may include clothing, gift-certificates, coupons, souvenirs, paraphernalia, memorabilia, and other goods and services. Other examples of non-digital content include autographed goods, posters, signs, enhancements, RFID products, or combinations thereof.

The types of digital content that can be offered and/or distributed are virtually unlimited. In some embodiments, the digital content at the event includes audio/video reproductions of the event, visual reproductions of the event, photographs of the event, transcriptions of the event, practice sessions, bloopers, interviews, event production information, and combinations thereof. By way of a non-limiting example, and when a music concert is the event, digital audio reproductions of the concert may be offered to those in attendance. Other recordings of a performer's music may also be offered to attendees of a concert. As another example, a personal copy of a movie may be offered to attendees at a move theater during or after a motion picture presentation.

In some embodiments, the attendees may attend the event at the event's physical location. In other embodiments, though, the attendees or may attend the event by experiencing it remotely, e.g., over the internet, by broadcast, conference call, pre-recorded reproduction, or combinations thereof. The skilled artisan will also recognize that remotely would include locations both geographically near and far from the event.

The content, whether digital or not, may be offered to attendees of an event through a variety of mechanisms. The offer can contain a description of the content, a price for the content, and any other pertinent information about the content. In some embodiments, the content can be offered using signs, publications, audible messages, visual messages, live or in-person messages, projection screens, banners, flyers, and any combinations thereof, some of which may be displayed by the kiosk 20. In other embodiments, the content can be offered through any known digital mechanism, such as forwarded to a web site.

The offer can include various types of advertising. Any type of advertising can be used, whether the content is purchased or not. Examples of the types of advertising include promotions, surveys, content-targeted advertisements (targeted to text, pictures, products, etc . . . ), image specific advertisements, venue specific advertisements, affiliate advertising, demographic specific advertisements, banner advertisements, cost per click advertisements, cost per pixel advertisements, wallpaper advertisements, screen-saver advertisements, sampling advertisements (i.e., movie trailers), flash pictures and videos, framed videos, pictures, commercials, pop-up advertisements, point of purchase advertisements, free downloads, advertisements displays before allowing access to the content, entertainment advertisements to keep the attendee entertained while waiting for transfer of the digital content, and promotional and discount codes displayed on screen after the purchase.

One example of an offer includes advertisements at a kiosk 20 that is located near the event. Another example of an offer includes advertisements digitally transferred to any attendee's portable electronic device. In both of these examples, the advertising may include messages used to market, promote, or sell products or services or to enhance brand recognition, as well as training materials, entertainment content, community or location information, and other similar materials. In other aspects, the advertising may include video clips, audio clips, ring tones, coupons, promotional codes, images, giveaways, discounts, or combinations thereof. In some embodiments, the advertising may be presented through video and/or audio presentations, animated PowerPoint presentations, flash programs, banners, pop-ups, screen-savers, wallpapers, posters, digital sampling, cost-per-pixel, cost-per-click, advertisement images, or combination. One example of the advertising includes the promotion of performers at the event.

In some aspects, the advertising can be bundled with the digital content. In these aspects, the advertising is incorporated with or delivered along with the digital content to the attendee in a digital or electronic format. One example of these aspects includes advertisements that are delivered with the content so that when a user accesses the content, the advertising is automatically displayed before or after the content. Another example includes advertisements that are delivered with the content so that the user can optionally choose to view the advertisement when the content is accessed. Yet another example includes advertisements that are part of a message or advertisements that are triggered when the digital content is transferred or when the content has been accessed a given number of times. In other aspects, the advertising is separate from the digital content. In these aspects, the advertising can still be delivered to the attendee, but is not incorporated (or bundled) with the content, such as advertisement that is transmitted with an offer for the content. In some embodiments, the advertising can be used to advertise to an attendee at a kiosk.

An offer of the content may comprise instructions on how to obtain the content. In some instances, such as when the content comprises non-digital content, the instructions may include directions to locations where the non-digital content may be purchased. In other instances, such as when the content comprises digital content, the instructions may include a phone number that an attendee may call, directions to a kiosk, an internet address, a text message address, an email address to contact, or combinations thereof. In some embodiments, the offer could contain a promotional code for a lottery drawing to win digital content.

The offer may be accepted by the attendee in any manner known in the art depending on the content and how the offer was made. In some embodiments, such as where an offer comprises a phone number to call in order to receive a digital recording of the event in exchange for money, an attendee may accept by dialing the number on a mobile phone. Dialing the number may constitute acceptance by the attendee or some other action, such as verbal conformation, identity conformation, or additional acceptance steps may be required. Depending on the nature of the offer, for example, an attendee may accept an offer by dialing a number on a phone or mobile communication device, sending a text message, calling a sales person, sending an email message, or accessing an internet address. Acceptance of an offer may also comprise the attendee providing billing information, delivery information, and/or identification information.

The content may also be delivered of distributed in any manner known in the art. Delivery of the content by an event attendee may take many forms depending on the nature of the goods and/or services and need not depend on the time of the event. In those embodiments where the content comprises non-digital content, it can be retrieved by the attendee or delivered to address specified by the attendee. In the embodiments where the content comprises digital content, it may be delivered on a physical content (either in person or delivered to an address), delivered electronically over an electronic communications network (i.e., the internet), or over a wireless communications network (i.e., directly from server 10 to the portable electronic device of the attendee). One example of delivery of the digital content includes retrieval from the kiosk 20 which can be located near the event or can be located at any other convenient location for the user (such as retail establishment that will be visited after the event).

There may be a cost associated with the content by the attendee. Such costs may be paid by the attendee through billing information given at the time of acceptance, through an invoice sent to the attendee, or through indirect billing (such as through the attendee's mobile communications service provider). The user can also be given any number of payment options from which can be used to pay for the digital content. The number and types of payment options are virtually unlimited and can include any known payment that can provide something of value to exchange for the content. Examples of the types of payments that can be used include credit cards, debit cards, cash, discounts from previous purchases, exchanges, electronic commerce accounts (such as PayPal®), and discounts awards. As well, the payment could include reward or award systems, such as airline rewards programs, hotel award programs, coupons, promotional codes, and awards for frequent buyers. Indeed, even virtual money created in electronic networks (such as in online simulated environments and online gaming systems) can be used.

In some embodiments, the systems can be used to hold a lottery during the event. In these embodiments, a random (or specific) caller (who is optionally a purchaser) can be given an award (i.e., a free song of the performer). For example, an offer to the attendee could include the message that every $10^{th}$ purchaser (or every $10^{th}$ caller) can win a free song form the performer or a free copy of the song being performed.

In addition to any previously indicated modification, numerous other variations and alternative arrangements may be devised by those skilled in the art without departing from the spirit and scope of this description, and appended claims are intended to cover such modifications and arrangements. Thus, while the information has been described above with particularity and detail in connection with what is presently deemed to be the most practical and preferred aspects, it will be apparent to those of ordinary skill in the art that numerous modifications, including, but not limited to, form, function, manner of operation and use may be made without departing from the principles and concepts set forth herein. Also, as used herein, examples are meant to be illustrative only and should not be construed to be limiting in any manner.

The invention claimed is:

1. A system for the distribution of digital content to an attendee of an event, the system comprising:
   a storage server storing one or more items of digital content;
   recording equipment electronically coupled to the storage server and comprising an audio recording component, a video recording component or both, the recording equipment configured to record on a real-time basis at least a portion of a live event and transfer on a real-time basis the at least a portion of the live event to the storage server; and
   a kiosk electronically connected to the storage server and the recording equipment, the kiosk comprising at least one video display, at least one input device, at least one output device, and a controlling device adapted to:
      obtain the one or more items of digital content from the storage server, the digital content comprising the at least a portion of the live event, a plurality of metatags, use instructions converted into digital rights management (DRM) information, and a unique transactional ID for each item of digital content correlating to particular DRM information to control how each associated item of digital content is managed on devices, wherein at least one metatag comprises information about the live event including a lottery for a back-stage pass for the live event, at least one metatag includes instructions on how the user can get or take delivery of the digital content, at least one metatag includes a coupon, at least one metatag includes information about a fan club for a performer at the live event, and at least one metatag indicating use instructions for the one or more items of digital content;
      receive a request from a user attending the event for a copy of the one or more items of digital content, wherein the request is received from the user remotely from the kiosk via a web portal in communication with the kiosk;
      collect user data relating to the user, the user's activities, or both;
      collect kiosk data relating to interaction of the user with the kiosk;
      bundle one or more advertisements in a digital format with the requested one or more items of digital content, the one or more bundled advertisements customized to the user on the basis of the collected user data and kiosk data; and
      distribute the one or more items of requested digital content to the user by instructing the recording equipment to send the one or more items of digital content directly to the user from the recording equipment.

2. The system of claim 1, wherein the kiosk distributes the one or more items of requested digital content to the user through the use of a wired connection.

3. The system of claim 1, wherein the kiosk distributes the one or more items of requested digital content to the user through the use of a wireless connection.

4. The system of claim 3, wherein the wireless connection comprises a 3G network.

5. The system of claim 3, wherein the recording equipment configured to record at least a portion of the live event is adapted to record at least one of an audio reproduction, audio/visual reproduction, one or more photographs, transcriptions of the event, interview from performers or attendees of the event, or combinations thereof.

6. The system of claim 1, wherein the customized current advertising directed to the user comprises one or more video clips.

7. The system of claim 1, wherein the customized current advertising directed to the user comprises the promotion of artists whose products are available for sale from the kiosk.

8. The system of claim 1, wherein the collected user data and kiosk data is shared with an external party.

9. The system of claim 8, wherein the collected user data and kiosk data is shared with a rights holder for the one or more items of digital content.

10. The system of claim 1, wherein the user data comprises email address information for use in customizing user interaction with the kiosk.

11. The system of claim 10 wherein the kiosk uses the email address information to subscribe the user to a community of one or more users expressing interest in the event.

12. The system of claim 1 wherein the kiosk is adapted to distribute the customized advertising in conjunction with the one or more items of requested digital content.

* * * * *